United States Patent [19]

Warsaw

[11] Patent Number: 4,899,595
[45] Date of Patent: Feb. 13, 1990

[54] MODULAR DYNAMOMETER WITH EXTENDED TESTING RANGE

[76] Inventor: Arthur J. Warsaw, 131 E. Main St., Colfax, Ill. 61728

[21] Appl. No.: 311,761

[22] Filed: Feb. 17, 1989

[51] Int. Cl.$^4$ .................................................. G01L 3/20
[52] U.S. Cl. .................................. 73/862.14; 188/296
[58] Field of Search ....................... 73/862.11, 862.14; 188/296; 60/363

[56] References Cited

U.S. PATENT DOCUMENTS

| | | |
|---|---|---|
| 1,174,678 | 3/1919 | Carpenter et al. |
| 1,498,877 | 6/1924 | Knee et al. |
| 1,550,833 | 8/1925 | Meyers |
| 1,874,129 | 8/1932 | Skinner |
| 2,191,261 | 2/1940 | Roberts |
| 2,372,704 | 4/1945 | Bennett ................................ 73/117 |
| 3,068,689 | 12/1962 | Warsaw |
| 3,119,256 | 1/1964 | Hitt et al. |
| 3,366,211 | 1/1968 | May |
| 3,698,243 | 10/1972 | Cline |
| 3,860,097 | 1/1975 | Braschler et al. ................... 188/296 |
| 3,902,360 | 9/1975 | Cline |
| 4,023,656 | 5/1977 | Kuwahara et al. |
| 4,062,233 | 12/1977 | Bonomo |
| 4,483,204 | 11/1984 | Warsaw |

OTHER PUBLICATIONS

Article from Mar., 1977 edition of Diesel & Gas Turbine Progress Worldwide entitled "High Speed Dynamometers For Load Testing Gas Turbines".

*Primary Examiner*—Charles A. Ruehl
*Attorney, Agent, or Firm*—Emrich & Dithmar

[57] ABSTRACT

A modular dynamometer includes a stator mounted to and disposed within a housing and the combustion of a shaft and a rotor also disposed within the housing. The shaft extends through the housing and is adapted for coupling to a prime mover. The housing is closed and is filled with a liquid coolant, such as water. Lateral panels of the housing may be removed after the coolant is drained out to permit one or more rotor/stator combinations to be positioned within the housing along the rotating shaft in an alternating manner. The rotors are attached to the shaft so as to rotate therewith, while the stators are mounted to the housing in a fixed manner. Rotor/stator modules may be easily added to or removed from the dynamometer to facilitate increasing or decreasing the dynamometer capacity permitting the modular dynamometer to test a wide range of prime mover output power.

23 Claims, 5 Drawing Sheets

DIRECTION OF ROTATION

MODULAR DYNAMOMETER WITH EXTENDED TESTING RANGE

BACKGROUND OF THE INVENTION

This invention relates generally to apparatus for measuring the output power of a prime mover and is particularly directed to a modular dynamometer capable of measuring prime mover output power over a wide range of values.

A dynamometer is a device for measuring the output power of a prime mover. The measurement may be made in terms of the RPMs of a rotating shaft, the torque, or other form of the prime mover's output power. The prime mover of interest may take on the form of virtually any power generating device such as an electric motor, a gasoline or diesel engine, a gas turbine, etc.

A dynamometer may take on various forms including that of a hydraulic brake which makes use of frictional energy conversion to measure prime mover output power. Such hydrokinetic dynamometers generally make use of one or more impellers positioned within a housing containing a working fluid as well as a circulating coolant. Each of the impellers, or rotors, is typically shrink-mounted on a rotating shaft in a spaced manner along the length of the shaft. Disposed between adjacent rotors is one of a plurality of stators. This type of dynamometer is expensive, cumbersome, and of generally fixed configuration, affording a limited output power measuring range. Moreover, such fixed configuration dynamometers are highly susceptible to excessive wear due primarily to cavitation where those components subject to this type of damage are generally inaccessible and thus not replaceable. In addition, the average prime mover repair shop is not capable of servicing such an assembly.

The typical prime mover rebuild/repair facility handles engines, motors, etc., having a wide range of sizes. Horsepower ranges of from 20–100 and from 200–700 up to 3000 horsepower in a single facility are common. Two or more dynamometers are commonly employed to cover this wide output power range. In an effort to reduce expenses a single dynamometer may be employed over a very wide output power range. Torque capacity is calculated as a function of RPM squared, where typical values encountered in the field are given by the following table.

TABLE

| RPM | TORQUE | HORSEPOWER (H.P.) |
| --- | --- | --- |
| 2100 | 5000 | 2000 |
| 1050 | 1250 | 250 |

Many engine dynamometer operators are forced to purchase a 2000 H.P. rated dynamometer in order to perform a 250 H.P. test of an engine at 1250 RPM. This type of measurement is virtually impossible on many single-rated capacity dynamometers.

Increased output power testing ranges are necessitated by current engine design trends which are to lower RPM's and associated higher torque values. All new diesel truck engines carry a specification labeled "Percent of Torque Rise". Lower engine operating RPM's are also related to:
1. 55 mile per hour speeds;
2. fuel economy;
3. emission standards (particularly the 1991–94 requirements);
4. longer engine life;
5. extended manufacturer's warranties; and
6. reduced engine weights with same horsepower rating.

One approach to increasing the measurement range of a hydrokinetic dynamometer involves the replacement of various components of he dynamometer, including the rotors, with different sized components. While offering an increased power measurement range, this approach relies upon a number of common components having different dimensions including size and weight variations, and thus is rather expensive and of limited commercial appeal. In addition, the use of limited production quantities of many different sized parts which are non-interchangeable is very uneconomical in terms of manufacturing costs. There is thus a great demand and need for expandable test equipment.

The present invention overcomes the aforementioned limitations of the prior art by providing a modular dynamometer which makes use of a basic rotor/stator module which may be used either by itself or with virtually any number of such modules to afford a wide output power measuring range. This invention eliminates the requirement of investing in, housing and maintaining large dollar amounts of surplus test facilities. The rotor is easily attached to or removed from a rotating shaft coupled to the prime mover, while each of the stators is easily installed in or removed from the dynamometer housing which is of fixed size and is easily assembled and disassembled. By making use of uniform modules all having the same configuration and dimensions, the present dynamometer offers an inexpensive approach for a dynamometer capable of accommodating a wide range of output power.

OBJECTS AND SUMMARY OF THE INVENTION

Accordingly, it is an object of the present invention to provide a prime mover output measuring apparatus capable of measuring the output over a wide range of values.

It is another object of the present invention to provide a modular dynamometer capable of measuring a wide range of prime mover output torque and RPMs using a plurality of identical rotor/stator modules which may be easily incorporated in or removed from the dynamometer on an individual basis.

Yet another object of the present invention is to facilitate the repair and replacement of parts in a dynamometer which is easily assembled and disassembled.

A further object of the present invention is to provide an impeller-type dynamometer in which individual impeller sections may be added or removed, as desired, to match the output power of a prime mover under test.

A still further object of the present invention is to reduce the inertia of the moving parts of a dynamometer to permit the output power of small engines to be accurately measured.

Another object of the present invention is to provide a dynamometer capable of operating with either flat or pocketed rotor blades.

This invention contemplates a dynamometer comprising: a closed housing containing a working liquid; a rotatable shaft positioned within and extending out of the housing in a sealed manner, wherein the shaft is coupled to and rotationally displaced by a prime mover having a given output power; a plurality of modules adapted for positioning within the housing and coupling to the shaft along the length thereof, wherein the number of modules coupled to the shaft establishes an output power measuring range of the dynamometer, with a larger number of modules coupled to the shaft for measuring larger output powers of the prime mover; coupling means for connecting the modules to the housing and the shaft in a manner which facilitates installation in and removal from the dynamometer of one or more of the modules in matching the dynamometer's output power measuring range with the prime mover's output power; and means coupled to the shaft for measuring the output power of a prime mover.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters, identify like elements throughout the various figures, in which:

FIG. is a side view of the stator shown in FIG. 5.

DETAILED DESCRIPTION OF THE PREFERRED EMBODIMENT

Figures 1, 1A, 1B, 2:
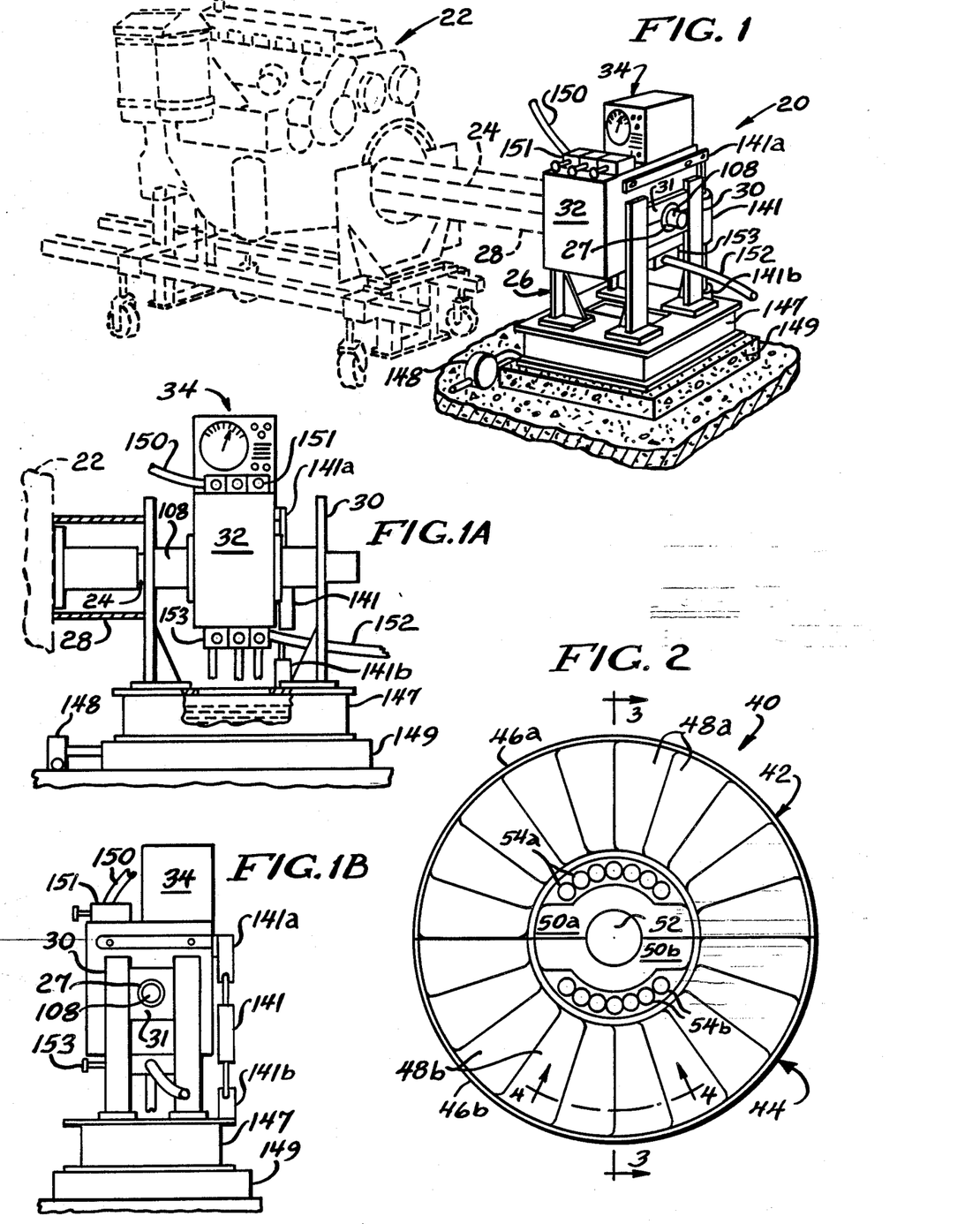
FIGS. 1, 1A and 1B show several views of a dynamometer in accordance with the present invention shown coupled to a typical prime mover such as an engine with which it is intended for use.
FIG. 2 is a plan view of a two-piece rotor for use in the modular dynamometer of the present invention.

Referring to FIGS. 1, 1A and 1B, there are shown perspective and plan views of a modular dynamometer 20 in accordance with the present invention coupled to a prime mover, which in FIG. 1, is represented by a conventional engine 22 shown in dotted line form. The modular dynamometer 20 is coupled to the engine 22 by means of a rotating shaft 24. While the prime mover is shown as an engine 22 in the figure, the modular dynamometer 20 of the present invention is intended for use with virtually any power generating device, the output of which is transmitted by means of rotational displacement. The shaft 24 should preferably be dynamically balanced and enclosed within a shaft coupler housing 28 which serves as a safety shield.

The modular dynamometer 20 includes a support frame 26 including a plurality of support leg/feet combinations 30 mounted to a support pad 149 and coupled to a closed housing 32 and providing stable support therefor. Disposed within the closed housing 32 and coupled to the rotating input shaft 24 by conventional means such as mounting bolts (not shown for simplicity) is a main shaft 108. The modular dynamometer further includes a measurement/control panel 34 which provides an operator with a visual indication of various prime mover and dynamometer operating parameters and includes input controls for regulating the operation of the dynamometer. The displays and control inputs may be conventional in design and operation and do not form a part of the present invention. Among these controls may be a working liquid/coolant flow control arrangement to permit the operator to regulate working liquid/coolant circulated through the modular dynamometer 20. Load control is accomplished by metering sufficient water into the dynamometer 20 as described below to establish a given degree of rotor/stator reaction. While internal pressure will normally build up within the rotor/stator area within the dynamometer 20, it will typically remain below 100 P.S.I. The water circulated through the closed housing 32 is for both prime mover loading and cooling.

The modular dynamometer 20 further includes a pump (not shown for simplicity) for directing a working liquid/coolant into the closed housing 32 via an inlet hose 150 and removing the working liquid/coolant therefrom via an outlet hose 152. The dynamometer 20 further includes a plurality of manually operated inlet and outlet valves 151, 153 respectively coupling the inlet and outlet hoses 150, 152 to the closed housing 32. With the measurement/control panel 34 coupled to the pump and by manipulating the inlet and outlet valves 151, 153, the loading on the prime mover and the rate of energy dissipation may be adjusted by an operator in accordance with the output of the prime mover and the capacity of the modular dynamometer 20. Positioned within the closed housing 32 and along the length of a rotating shaft therein are one or more modules each comprised of a rotor and a stator as described in detail in the following paragraphs. Each of the respective inlet and outlet valves 151, 153 allows the working liquid/coolant to flow into and to flow out of a respective one of the aforementioned modules as described below.

The restriction of fluid flow out of the closed housing 32 by means of the outlet valve 153 can result in the liquid, i.e., water, being heated to above atmospheric boiling temperature. This is to be avoided because of the possibility of excessive cavitation causing a loss of stable loading and excess pressure buildup within the modular dynamometer 20. Either excess cavitation or excessive pressure buildup can lead to either explosion of the closed housing or dangerous flash off of steam and water out of the exhaust system. Water is optimally maintained at 180° C. at the outlet valves 153 for safety and for avoiding excessive cavitation.

The modular dynamometer further includes a sump 147 in combination with a discharge pump 148. In addition to regulating the outlet flow of the liquid from the closed housing 32, the outlet valves 153 also permit a portion of the flowing liquid to be discharged into the sump 147. This allows dumping of the outlet water via gravity by means of the outlet valves 153 so as to provide a "zero pressure" condition within the individual modules of the dynamometer 20. This also allows a minimum load control to be achieved by the free flowing of a minimum amount of liquid through the closed housing 32. This ensures high operating efficiency of the dynamometer. The discharge pump 148 permits removal of the liquid from the sump 147 and its discharge to waste.

The modular dynamometer 20 further includes a torque sensing strain gauge 141. The first end 141a of the torque sensing strain gauge 141 is attached to a bracket mounted to the closed housing 32, while a second end 141b of the torque sensing strain gage is coupled to the sump 147. The torque reaction of the modular dynamometer 20 to the rotating input shaft 24 attached to the prime mover 22 is transferred from the dynamometer's stators to the closed housing 32. This torque applied to the main housing 32 is then measured by the torque sensing strain gauge 141 which provides an appropriate input to the measurement/control panel 34 for providing a visual indication to the dynamometer operator of the output torque of the prime mover. The torque sensing strain gauge 141 is coupled to the measurement/control panel by conventional means such as an electrical signal conductor, although this is not shown for simplicity.

Each pair of adjacent leg support/feet combinations 30 are coupled by means of a cross member 31. Each of the cross members 31 is coupled onto the main shaft 108 disposed within and extending from the closed housing 32 by means of a respective bearing cradle 27. Each of the bearing cradles 27 allows the main shaft 108 to freely rotate within each of cross members 31.

Figure 3:
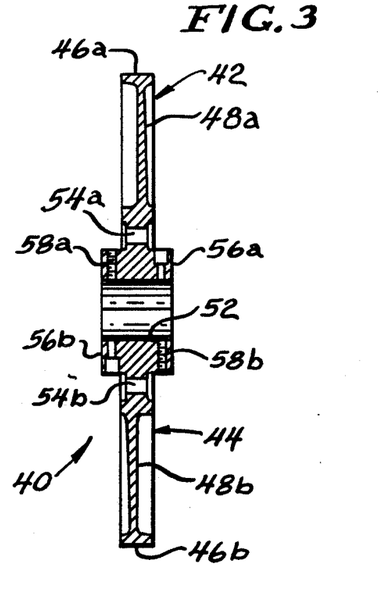
FIG. 3 is a sectional view of the two-piece rotor shown in FIG. 2 taken along sight line 3—3 therein.
Figure 4:
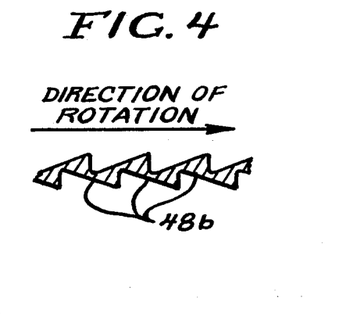
FIG. 4 is a sectional view of a portion of the two-piece rotor shown in FIG. 2 taken along sight line 4—4 therein.

Referring to FIG. 2, there is shown a plan view of a rotor 40 for use in the modular dynamometer of the present invention. FIGS. 3 and 4 are sectional views of the rotor 40 respectively taken along sight lines 3—3 and 4—4 in FIG. 2. The rotor 40 includes an upper half 42 and a lower half 44 which are symmetrical and identical in configuration and dimensions. Thus, the 180°-sector upper and lower halves 42, 44 each include a respective semi-circular outer rim 46a, 46b and an inner mounting hub 50a, 50b. In the upper half 42, a plurality of vanes 48a are disposed between and coupled to the outer rim 46a and the inner mounting hub 50a. Similarly, a plurality of vanes 48b are coupled to and disposed between the outer rim 46b and the inner mounting hub 50b of the lower half 44 of the rotor 40. A circular center aperture 52 is disposed between and defined by the abutting inner mounting hubs 50a and 50b. Inner mounting hubs 50a and 50b are each provided with a plurality of spaced balancing apertures 54a and 54b, respectively, which allow for mass balancing both halves of the rotor to eliminate vibration during rotation. Each of the upper and lower halves 42, 44 is adapted for positioning about a rotating shaft (not shown) within the modular dynamometer which is inserted through the center aperture 52 of the rotor 40.

Each of the inner mounting hubs 50a, 50b is provided with a pair of spaced slots, or bores, for insertion of a receptive coupling pin therein for securely attaching the rotor 40 to a rotating shaft. Thus, a first mounting pin (not shown) inserted through slot 56b in inner mounting hub 50b is adapted for insertion through a shaft disposed within the center aperture 52 and for further insertion into a threaded slot 58a within inner mounting hub 50a. Similarly, a smooth slot 56a within the inner mounting hub 50a is adapted to receive a threaded mounting pin which is inserted through a shaft positioned within the center aperture 52 and for further insertion into a threaded slot 58b in inner mounting hub 50b. In this manner, the upper and lower halves 42, 44 of the rotor 40 may be securely coupled together and fixedly mounted to a cylindrical shaft having a pair of spaced apertures therein.

As indicated above, each of the rotor halves 42 and 44 is provided with a plurality of radially spaced vanes 48a and 48b, respectively. Each of the vanes provides an upraised portion on facing surfaces of the rotor 40 for displacing a liquid such as water disposed within the modular dynamometer's closed housing. Each of the vanes, as shown for the case of vanes 48b of the lower half 44 of the rotor 40 in FIG. 4, includes a leading edge oriented generally transverse to the direction of rotation of the rotor. Each of the vanes 48b further includes a second trailing edge oblique to the direction of rotation of the rotor. Each of the leading edges of the vanes 48b is provided with a female pocket, although the present invention can equally as well make use of rotors having vanes with a flat blade leading edge.

Figure 5:
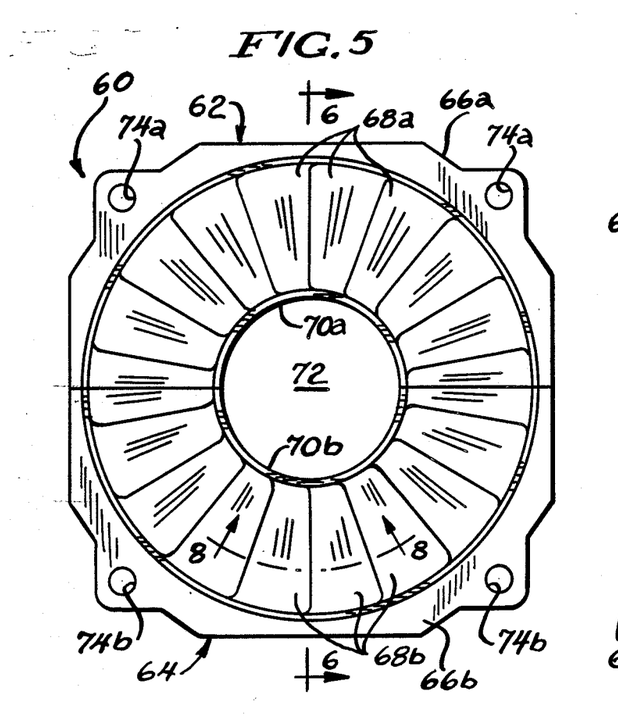
FIG. 5 is a plan view of a two-piece stator for use in the modular dynamometer of the present invention.
Figure 6:
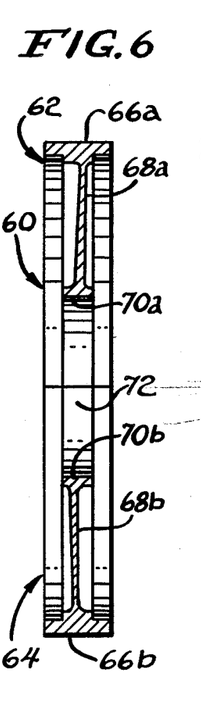
FIG. 6 is a sectional view of the two-piece stator shown in FIG. 5 taken along sight line 6—6 therein.
Figure 7:
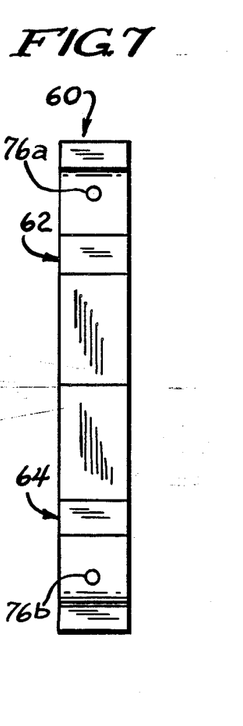
Figure 8:
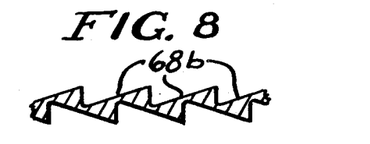
FIG. 8, is a sectional view of a portion of the two-piece stator shown in FIG. 5 taken along sight line 7—7 therein.

Referring to FIG. 5, there is shown a plan view of a stator 60 for use in the modular dynamometer of the present invention. FIGS. 6 and 8 are sectional views of the stator 60 shown in FIG. 5 taken respectively along sight lines 6—6 and 8—8, therein. FIG. 7 is a side view of the stator 60 shown in FIG. 5. The stator 60 also includes an upper half 62 and a lower half 64 which are symmetrical relative to each other and with respect to an axis passing through the center of an aperture 72 within the stator 60 and oriented transverse to the plane of the stator. The upper half 62 is provided with a plurality of radially spaced vanes 68a, while the lower half 64 is similarly provided with a plurality of radially spaced vanes 68b. The upper half 62 includes an outer peripheral portion 66a, while the lower half 64 also is provided with a corresponding outer peripheral portion 66b. A first pair of apertures 74a are provided in the outer peripheral portion 66a of the upper half 62. The lower half 64 is also provided with a first pair of spaced apertures 74b disposed in respective corners of the lower half of the stator 60. The upper and lower halves 62, 64 of the stator 60 are further respectively provided with inner, semicircular rims 70a, 70b. The inner rims 70a, 70b are adapted for mutual engagement at the respective ends thereof so as to form a circular aperture 72 in the center of the stator 60. In assembling a module comprised of a stator 60 and a rotor 40, the facing portions of the rotor's inner mounting hub halves 50a, 50b, are positioned within the stator's center aperture 72 in a spaced manner to allow for free rotation of the rotor within the stator.

As shown in FIG. 8, the vanes 68b in the stator are of the same general configuration as the vanes provided for in the rotor as previously described. The aforementioned first sets of apertures 74a and 74b disposed in respective corners of the stator 60 are used for securely mounting the stator in the modular dynamometer support frame as described below. As shown in FIG. 7, the upper half 62 of the stator 60 is further provided with a second pair of apertures 76a disposed on respective lateral, facing surfaces of the stator. Similarly, the lower half 64 of the stator 60 is provided with a pair of spaced second apertures 76b in respective lateral, facing surfaces of the stator. The second pairs of apertures 76a and 76b are each adapted for receiving a respective snugging pin (not shown) for locking the stator in position within the modular dynamometer's support frame as described below.

Figure 9:
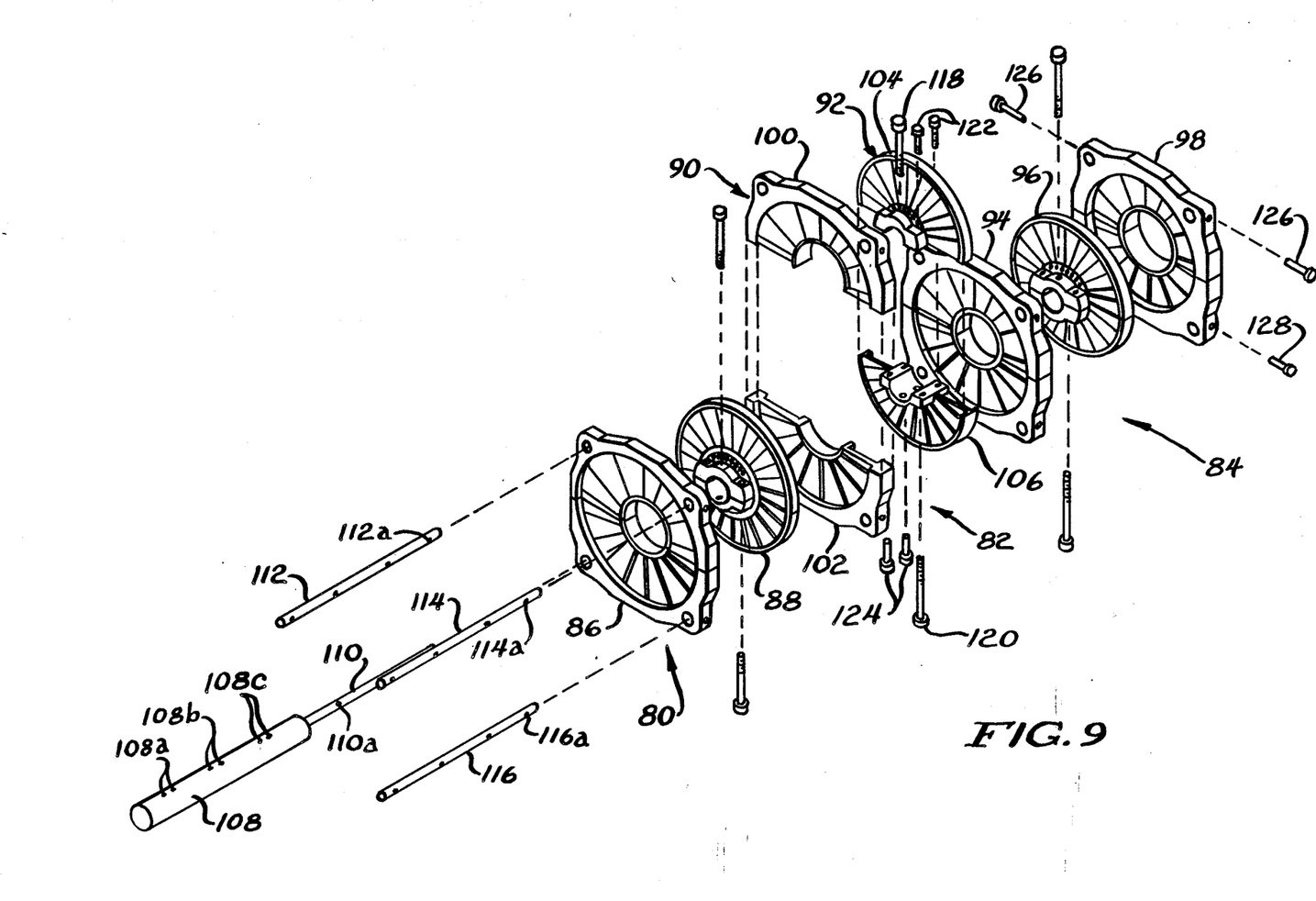
FIG. 9 is an exploded perspective view of a plurality of dynamometer modules, each including a rotor and a stator in accordance with the principles of the present invention.

Referring to FIG. 9, there is shown an exploded perspective view of the inner portion of a modular dynamometer in accordance with the present invention. The portion of the modular dynamometer shown in FIG. 9 includes first, second and third modules 80, 82 and 84 each comprised of a respective rotor and stator combination. Thus, the first module 80 is comprised of a first stator 86 and a first rotor 88. The second module 82 is comprised of a second stator 90 and a second rotor 92. Similarly, the third module 84 is comprised of a third stator 94 and a third rotor 96. A fourth stator 98 is positioned on the end of the modular dynamometer arrangement as shown in FIG. 9 in close proximity to the third rotor 96. The fourth stator 98 is further adapted for close positioning to yet another rotor which is not shown in the figure for the purpose of providing an expansion capability to the modular dynamometer of the present invention.

The second stator 90 and the second rotor 92 are shown in exploded form for the purpose of illustrating how the rotor halves 100, 102 are coupled together on a main shaft 108 as well as to illustrate the manner in which the stator is mounted in the modular dynamometer's support frame. The following discussion applies equally to all of the rotors and stators shown in FIG. 9.

The center apertures in the stator 90 and rotor 92 are adapted to receive the main shaft 108. The main shaft 108 is either directly or indirectly coupled to a prime mover (not shown) and is rotationally displaced thereby to provide a measure of the output power of the prime mover. Disposed along the length of the main shaft 108 are a plurality of pairs of spaced apertures 108a, 108b and 108c. Previously described pairs of apertures in the upper half 104 and the lower half 106 of the rotor 92 are adapted to receive threaded upper and lower rotor mounting pins 118 and 120. Each of the mounting pins 118 and 120 is adapted for insertion through a respective pair of aligned apertures in the upper and lower halves 104, 106 of the rotor 92 as well as through one of the paired apertures 108b in the main shaft 108. After insertion through one-half of the rotor and through the main shaft 108, each of the mounting pins 118, 120 securely engages the other half of the rotor in a threaded manner in securely mounting the rotor 92 to the main shaft. An upper pair of rotor coupling pins 122 is adapted for insertion through a pair of apertures in the rotor's upper half 104 for engaging the rotor's lower half 106 in a threaded manner. Similarly, a pair of lower rotor coupling pins 124 is adapted for insertion through the rotor's lower half 106 so as to engage the rotor's upper half 104 in a threaded manner. The upper and lower pairs of rotor coupling pins 122, 124 thus securely attach the upper and lower halves 104, 106 of the rotor 92. With each of the rotors thus securely mounted to the main shaft 108, rotation of the main shaft by the prime mover results in a corresponding rotation of each of the rotors mounted along the length thereof.

There are also provided first, second, third and fourth tie rods 110, 112, 114 and 116. Each of the tie rods is adapted for insertion through a respective corner aperture in each of the stators. For example, as shown for the case of stator 86 in FIG. 9, the first tie rod 110 is adapted for insertion in the aperture in the lower left hand corner of the stator as viewed in FIG. 9. Similarly, the second tie rod 12 is adapted for insertion through the aperture in the upper left hand corner of stator 86. Each of the tie rods extends the full length of the modular dynamometer so as to be inserted through the corner apertures of all of the stators in the dynamometer.

The first, second, third and fourth tie rods 110, 112, 114 and 116 each are provided with a plurality of respective spaced apertures 110a, 112a, 114a and 116a along the length thereof. With a tie rod positioned within the aligned apertures of a plurality of spaced stators, each of the aforementioned tie rod apertures is disposed within a given stator. Thus, with reference back to FIGS. 5 and 7, with a tie rod inserted through one of the first pair of apertures 74b in the lower half 64 of the stator, one of the apertures along the length of the tie rod will be aligned with one of the second apertures 74b also in the stator's lower half. Each of the second apertures 76a and 76b in the upper and lower halves of the stator is adapted to receive a respective snugging pin 126, 128. Thus, the lateral apertures in each of the upper stator halves is adapted to receive one of the upper pair of stator snugging pins 126, while each of the lateral apertures in the lower half of a stator is adapted to receive one of the lower pair of stator snugging pins 128. The upper and lower snugging pins 126, 128 are inserted in the apertures 76a and 76b in the end stator. Thus, the four tie rods 110, 112, 114 and 116 maintain the stators in alignment, while the snugging pins 126 and 128 inserted in the end stator and through each of the tie rods provides secure, rigid coupling between the stators.

Figure 10:
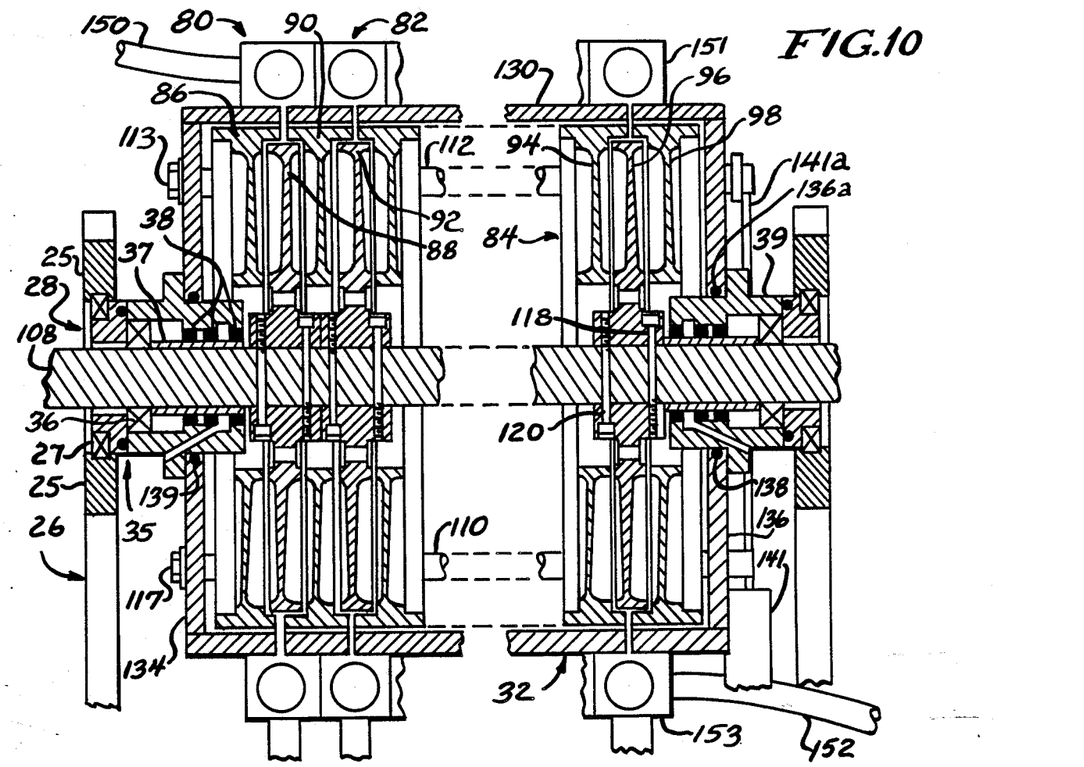
FIG. 10 is a sectional view of the modular dynamometer of the present invention.

Referring to FIG. 10, there is shown a sectional view of the modular dynamometer arrangement shown in FIG. 9 positioned within a closed housing 32. The closed housing 32 includes front and rear panels 134, 136, top and bottom panels 130, 132, and a pair of facing lateral panels which are not shown in FIG. 10. The various panels are preferably comprised of metal such as aluminum and are arranged so as to form a closed, box-like structure. The front panel 134 includes an aperture in which is positioned and through which extends the shaft coupler housing 28. Disposed about the main shaft 108 and within an aperture in the front panel 134 in a sealed manner is a first bearing cartridge assembly 35. The front panel 134 further includes four spaced apertures in which are positioned and through which extend a respective one of upper and lower pairs of mounting pins 113 and 117. Threaded upper mounting pins 113 are inserted through respective apertures in the front panel 134 and engage a respective one of the upper tie rods to maintain the end of the tie rod in fixed position. Similarly, the lower mounting pins 117 are inserted through respective apertures in the front panel 134 and engage an end of a respective one of the lower tie rods so as to ensure secure positioning of the lower tie rods within the closed housing 32. Tightening of each of the upper and lower pairs of mounting pins 113, 117 draws each stator into tight fitting engagement with an adjacent stator or a pair of adjacent stators. One end of the main shaft 108 is positioned within the center aperture 136a of the rear panel 136, with a sealed bearing 138 disposed between the rear panel and a second bearing cartridge assembly 39 to facilitate main shaft rotation without the leakage of a liquid disposed within the closed housing 32. The torque sensing strain gauge 141 is coupled to the right end of the tie rods as shown in FIG. 10 to directly sense the torque of the prime mover applied to the tie bars through the stators.

Another O-ring seal 139 is disposed about the first bearing cartridge assembly 35 and in contact with the front panel 134 to prevent escape of liquid from the closed housing 32. The rotating main shaft 108 extends through the shaft coupler housing 28 and is freely rotatable therein. Disposed about a portion of the length of the main shaft 108 in tight fitting relation is an elongated sleeve 37. Disposed between the sleeve 37 and the first bearing cartridge assembly housing are a plurality of spaced seals 38 which prevent leakage of a lubricant disposed within the bearing cartridge assembly. Also disposed in contact with the periphery of the main shaft 108 is a roller bearing 36 to facilitate rotation of the main shaft within the shaft coupler housing 28. The sealed coupling arrangement including the shaft coupler housing 28 for coupling the rotating main shaft 108 to the closed housing 32 may be generally referred to as the aforementioned bearing cartridge assembly. The bearing cartridge assemblies 35, 39 may be of the oil or grease lubricated type. The various aforementioned seals ensure confinement of the lubricant within the bearing cartridge assembly.

As shown in FIG. 10, the first and second modules 80, 82 are positioned in closely spaced relation when the modular dynamometer is assembled. Each of the rotors is securely mounted to the rotating main shaft 108 and is free to rotate therewith, with each of the rotors disposed between adjacent, facing stators. As shown in the third module 84, the upper and lower halves of the rotor 96 are securely coupled together and mounted to the rotating main shaft 108 by means of upper and lower mounting pins 118, 120. FIG. 10 also illustrates that various other modules, or rotor/stator combinations, may be positioned within the closed housing 32 along the length of the main shaft 108 between the second and third modules 82 and 84. Each module positioned along the length of the main shaft 108 increases the output power measuring capacity of the modular dynamometer. For example, the modular dynamometer of the present invention contemplates the use of a single module for measuring low output prime movers, while virtually any number of additional modules may be incorporated in the modular dynamometer for increasing its output power measuring capacity to accommodate virtually any output power. Each of the modules is easily positioned within the closed housing 32, as described below, and mounted to and about the rotating main shaft 108. Thus, a single dynamometer in accordance with the present invention may be used to measure a wide range of prime mover output power using a common power absorption module in a repetitive manner to match the dynamometer's output power measuring capacity with the prime mover being tested.

Figure 11:
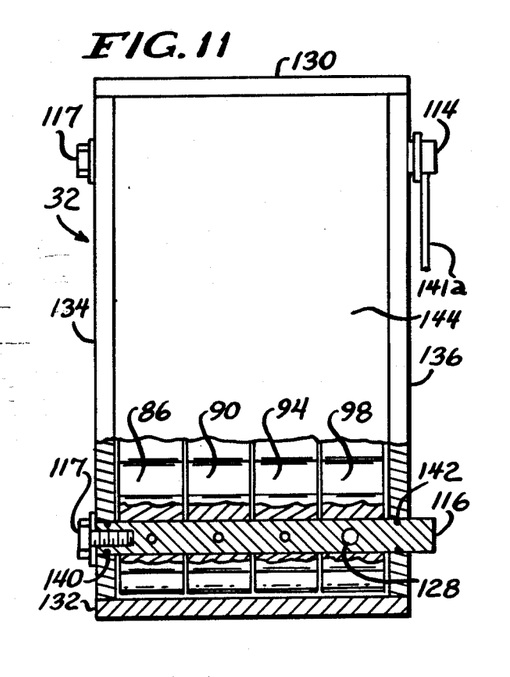
FIG. 11 is a partially cutaway sectional view of a portion of the modular dynamometer shown in FIG. 10 illustrating the details of the manner in which the modules are assembled and coupled together.
Figure 12:
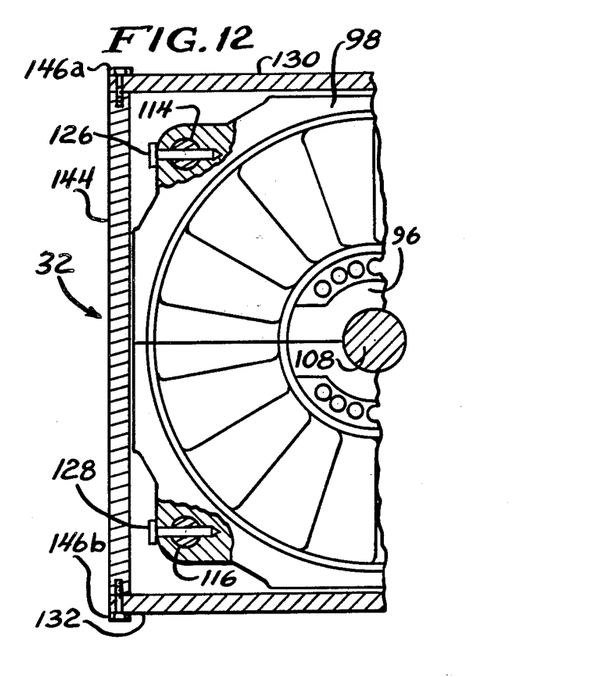
FIG. 12 is a sectional view of the modular dynamometer shown in FIG. 10 illustrating additional details of the manner in which the modules are coupled together and held in place in the dynamometer.

Referring to FIGS. 11 and 12, there are shown details of the manner in which the fourth tie rod 116 is inserted and maintained in position within the closed housing 32. The fourth tie rod 116 is inserted through aligned apertures in the front and rear panels 134, 136 of the closed housing 32. A forward seal 140 is disposed about the tie rod 116 within the front panel 134, while an aft seal 142 is disposed about the tie rod as positioned within the aperture in the rear panel 136. The forward and aft seals 140, 142 prevent leakage of the working/coolant liquid disposed within the closed housing 32. A threaded mounting pin 117 engages an end of the tie rod 116 in securing the tie rod end to the front panel 134 and to draw the stators of each module into close, tight fitting contact to prevent the liquid from leaking from the individual modules. A snugging pin 128 is positioned within respective spaced slots within each of the tie rods and through the end stator. Each of the snugging pins 126, 128 is inserted through an upper or lower portion of a stator as shown in FIG. 12 for securely coupling all of the stators in forming a rigid structure and for maintaining the stators in a fixed position within the closed housing 32 and to prevent liquid leaks. The main shaft 108 extends through and is free to rotate with respect to each of the stators 86 as shown in FIG. 12. Also as shown in FIG. 12, coupling pins 146a and 146b respectively couple the top panel 130 and the bottom panel 132 to a side panel 144. Similar coupling pin arrangements may be used to securely couple the various other panels of the closed housing so as to form a tightly sealed structure. The coupling pin arrangement shown in FIG. 12 allows the side panels to be easily removed from the closed housing 32 to either remove or incorporate modules in the dynamometer to match its output power measuring capacity with the prime mover being measured. A drain may be provided within a lower portion of the closed hosing 32 and connected to the aforementioned sump via a hose to accommodate leakage from and splash within the closed housing.

Figures 13, 14, 15, 16, 17, 18, 19:
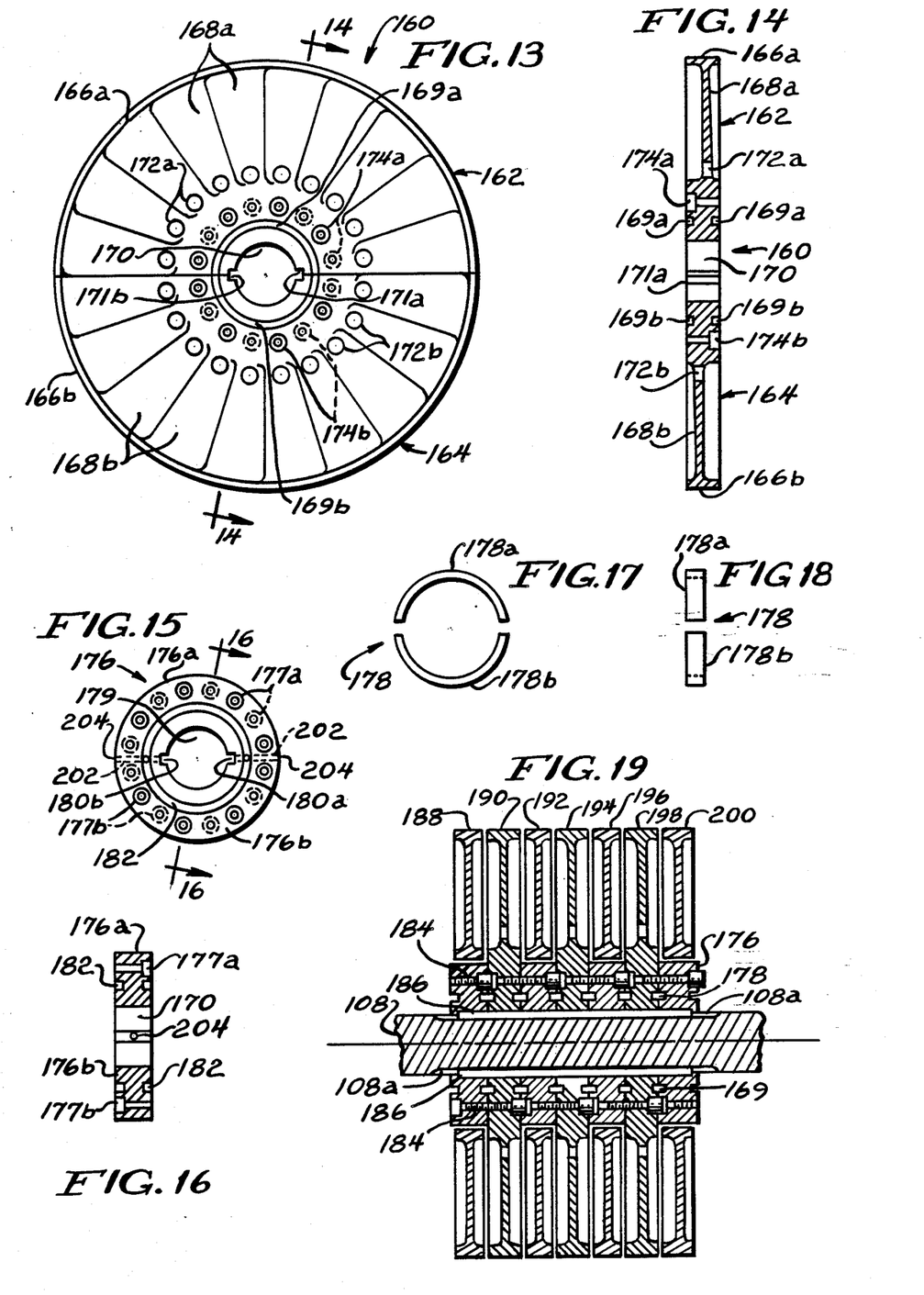
FIG. 13 is a plan view of another embodiment of a rotor for use in the modular dynamometer of the present invention.
FIG. 14 is a sectional view of the rotor illustrated in FIG. 13 taken along sight line 14—14 therein.
FIG. 15 is a plan view of a retainer spacer for use with the rotor shown in FIG. 13.
FIG. 16 is a sectional view of the retainer spacer shown in FIG. 15 taken along sight line 16—16 therein.
FIG. 17 is a plan view of a two-piece annular retainer ring for use with the rotor shown in FIG. 13 and the retainer spacer shown in FIG. 15.
FIG. 18 is a side plan view of the annular retainer ring shown in FIG. 17.
FIG. 19 is a top sectional view of an inner portion of a modular dynamometer incorporating the stator of FIG. 13, the retainer spacer of FIG. 15, and the annular retaining ring of FIG. 17.

Referring to FIG. 13, there is shown a plan view of another embodiment of a rotor 160 for use in the modular dynamometer of the present invention. A sectional view of the rotor 160 shown in FIG. 13 taken along sight line 14—14 therein is illustrated in FIG. 14. The rotor 160 includes an upper half portion 162 and a lower half portion 164 which are each generally semicircular and mirror images of one another. The upper half portion 162 of the rotor 10 includes a plurality of radially spaced vanes 168a, while the lower half portion 164 of the rotor is provided with a similar radial arrangement of spaced vanes 168b. The upper and lower half portions 162, 164 of the rotor 160 each include a respective outer rim 166a, 166b. Disposed in a spaced manner about an inner portion of the rotor 160 adjacent to the inner end of each of the vanes are a plurality of first fluid balancing apertures 172a in the upper half portion 162 and second fluid balancing apertures 172b in the lower half portion 164 of the rotor. The upper and lower half portions 162, 164 of the rotor 160 further include respective third and fourth pluralities of radially spaced threaded coupling apertures 174a and 174b. The rotor 160 includes a center aperture 170 having a pair of diametrically disposed keyways 171a and 171b. An annular channel is disposed about the rotor's center aperture 170 and is formed of generally semi-circular channels 169a and 169b in the upper and lower half portions 162, 164, respectively, of the rotor. One of the aforementioned annular channels is disposed on each facing surface of the rotor 160.

Referring to FIG. 15, there is shown a plan view of an annular retainer spacer 76 disposed between and in intimate contact with adjacent rotors in the modular dynamometer as shown in the sectional view of FIG. 19. A sectional view of the retainer spacer 176 shown in FIG. 15 taken along sight line 16—16 therein is illustrated in FIG. 16. The retainer spacer 176 includes an upper half portion 176a and a lower half portion 176b, which are each generally semicircular and mirror images of one another. With the two half portions 176a, 176b assembled, or positioned in abutting contact, the retainer spacer 176 includes a center aperture 179 having a pair of keyways 180a, 180b disposed diametrically therein. Disposed around an outer portion of the retainer spacer 176 are a plurality of spaced threaded apertures, or channels. The upper half portion 176a of the retainer spacer is provided with a first plurality of such threaded apertures 177a, while the retainer spacer's lower half portion 176b is provided with a similar arrangement of threaded apertures 177b. Each of the aforementioned threaded apertures extends through the retainer spacer 176 and is adapted for receiving a threaded coupling pin 184 such as a bolt as shown in FIG. 19. A pair of annular channels 182 are disposed on facing surfaces of the retainer spacer 176 intermediate its center aperture 179 and the aforementioned radially disposed threaded apertures 177a and 177b. With a rotor and a retainer spacer 176 disposed about the dynamometer's main shaft 108 and in abutting contact, as shown in FIG. 19, the apertures within the rotor and retainer spacer are placed in alignment. Thus, the channels 177a, 177b in the retainer spacer 176 are aligned with the apertures 174a and 174b, respectively, in a rotor. In this manner, each adjacent, abutting pair of rotors and retainer spacers may be securely coupled together.

Referring to FIG. 17, there is shown a plan view of upper and lower halves 178a and 178b of an annular retaining ring 178. A side view of the annular retaining ring 178 is shown in FIG. 18. Each of the annular retaining ring halves 178a, 178b is adapted for insertion within and between the annular channels 169a, 169b of the rotor 160 and the annular channels 182 of the retainer spacer 176, as shown in FIG. 19 and described in detail in the following paragraphs.

FIG. 19 is a lateral sectional view showing a plurality of modules, each comprising the combination of a rotor and stator disposed about the main shaft 108 of the modular dynamometer. The portion of a modular dynamometer shown in FIG. 19 includes first, second, third and fourth stators 188, 192, 196 and 200. The modular dynamometer further includes first, second and third rotors 190, 194, and 198. As described above, each stator is disposed between adjacent rotors in an alternating manner, and vice versa. The dynamometer's main shaft 108 is positioned within and inserted through the center apertures of each of the aforementioned rotors and stators. Similarly, the main shaft 108 is inserted through the center aperture in each of a plurality of retainer spacers 176, each of which is positioned between and in intimate contact with adjacent rotors. As shown in FIG. 19, the modular dynamometer's main shaft 108 is provided with a pair of diametrically disposed slots 108a extending along the length of the main shaft. Each of these elongated, linear slots 108a is aligned with a respective one of the keyways 171a and 171b of a rotor and keyways 180a and 180b of a retainer spacer 176. An elongated, linear key 186 is inserted in each pair of aligned slots 108a within the main shaft 108 and keyways in the rotors and retainer spacers disposed about the main shaft 108. This slot/keyway arrangement in combination with the pair of keys 186 provides secure coupling between the main shaft 108 and each of the rotor/retainer spacer combinations. Thus, each of the rotors and retainer spacers rotate in unison with rotational displacement of the main shaft 108.

An annular retainer ring 178 is disposed within the facing annular slots of an immediately adjacent pair of a rotor and a retainer spacer. Thus, as shown in FIG. 19, the annular retainer ring 178 is disposed within the respective facing annular slots within the third rotor 198 and the retainer spacer 176. A plurality of coupling bolts 184 are inserted through the aligned apertures of each pair of adjacent rotors and retainer spacers. Each of the coupling bolts 184 is thus inserted through a smooth slot within one of the rotors and is further inserted through a threaded slot within an immediately adjacent retainer spacer for securely coupling adjacent rotors and retainer spacers. Referring back to FIGS. 15 and 16, each of the retainer spacers 176 includes a pair of opposed radially oriented slots 202 extending into each of the respective keyways 180a and 180b. Each of the radial slots 202 is provided with a threaded interior for receiving a threaded security pin 204. The security pins 204 are adapted for radial insertion into each of the retainer spacers 176 and through a respective one of security pins 204 are adapted for radial insertion into each of the retainer spacers 176 and through a respective one of the keys 186 and into the dynamometer's main shaft 108. This provides secure coupling between each of the retainer spacers 176 and the dynamometer's main shaft 108.

The primary advantage of the rotor and retainer spacer combinations shown in FIG. 19 is improved safety in that the possibility of centrifugal damage or disassembly of the modules during operation of the modular dynamometer is essentially eliminated. The various coupling pins and key/keyway combinations produce extremely secure coupling between the various spaced rotors and the dynamometer's main shaft in essentially eliminating the possibility of structural breakdown in the dynamometer caused by centrifugal forces.

There has thus been shown a modular dynamometer for measuring the output power of a prime move which makes use of one or more rotor/stator modules which may be easily added to or removed from the dynamometer for increasing or decreasing its output power measuring range. A rotating main shaft is disposed within the closed housing from which side panels may be easily removed to facilitate rotor/stator module incorporation in or removal from the dynamometer. Each rotor is securely mounted to the rotating main shaft in a spaced manner along its length, while each stator is disposed about the main shaft between adjacent rotors by securely attaching it to the closed housing in a fixed manner. Not only may individual rotor/stator modules be easily added to or removed from the dynamometer for adapting its power measuring capacity to the output of the prime mover to be measured, but high wear items such as a rotor may be easily replaced when needed. In addition, various types of rotors such as smooth rotors as well as those having various types of blades, i.e., flat blade, angular blade, or pocketed blade, may be easily interchanged depending upon the test conditions and prime mover encountered.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A dynamometer comprising: a closed housing containing a working liquid; a rotatable shaft positioned within and extending out of said housing in a sealed manner, wherein said shaft is coupled to and rotationally displaced by a prime mover having a given output power; a plurality of modules disposed within said housing and coupled to said shaft along the length thereof, wherein the number of modules coupled to said shaft establishes an output power measuring range of the dynamometer, with a larger number of modules coupled to said shaft for larger output powers of the prime mover; coupling means for connecting said modules to said housing and said shaft in a manner which facilitates installation in and removal from the dynamometer of one or more of said modules in matching the dynamometer's output power measuring range with the prime mover's output power; and means coupled to said housing and responsive to rotation of said shaft for measuring the output power of a prime mover.

2. The dynamometer of claim 1 wherein each of said modules includes a rotor and a stator.

3. The dynamometer of claim 2 wherein said coupling means includes first and second coupling arrangements for respectively coupling said rotors to said shaft and said stators to said housing.

4. The dynamometer of claim 3 wherein each rotor includes first and second members positioned in abutting contact and symmetrically disposed about said shaft.

5. The dynamometer of claim 4 wherein said first coupling arrangement includes a first plurality of mounting pins inserted through said shaft and into said first and second symmetrical members.

6. The dynamometer of claim 5 wherein each of said mounting pins is threaded.

7. The dynamometer of claim 5 wherein said first coupling arrangement further includes a second plurality of mounting pins coupling said first and second symmetrical members.

8. The dynamometer of claim 4 wherein each of said first and second symmetrical members is generally semicircular and includes a plurality of radially spaced vanes disposed thereabout.

9. The dynamometer of claim 4 wherein each of said first and second symmetrical members includes a plurality of spaced fluid balancing apertures.

10. The dynamometer of claim 3 wherein each stator includes first and second symmetrical members disposed around said shaft and fixed mounting to said housing.

11. The dynamometer of claim 10 wherein said second coupling arrangement includes a plurality of elongated, linear tie rods inserted through each of said stator symmetrical members.

12. The dynamometer of claim 11 wherein said second coupling arrangement further includes retention means for securely maintaining said tie rods in position within said stators.

13. The dynamometer of claim 12 wherein said retention means includes a plurality of retaining pins each disposed in an end stator and inserted through one of said tie rods.

14. The dynamometer of claim 10 wherein each of the stator's first and second symmetrical members has a plurality of radially spaced vanes disposed thereabout.

15. The dynamometer of claim 1 wherein each of said modules includes a rotor and a stator, with each rotor and stator having a center aperture through which said shaft extends, and wherein said rotors and stators are positioned in an alternating manner along the length of said shaft.

16. The dynamometer of claim 1 wherein said housing includes a plurality of flat panels and coupling means for connecting said panels in an easily removable manner.

17. The dynamometer of claim 16 wherein said housing includes front, rear, top and bottom panels as well as side panels and wherein said coupling means includes a plurality of connecting elements coupling said side panels to said other panels in an easily removable manner.

18. The dynamometer of claim 17 wherein said shaft extends through said front and rear panels and the dynamometer further includes first and second seals respectively disposed between said rotating shaft and said front and rear panels.

19. The dynamometer of claim 1 further comprising inlet and outlet means coupled to said housing for respectively providing the working liquid to each of said modules and removing the working liquid from each of the modules.

20. The dynamometer of claim 19 wherein said inlet means includes a plurality of inlet valves and said outlet means includes a plurality of outlet valves and wherein each of said inlet and outlet valves is coupled to a respective one of said modules.

21. The dynamometer of claim 20 wherein each of said inlet and outlet valves is a manually operated valve and wherein each pair of inlet and outlet valves coupled to a respective module allows for precise control of the flow of the working liquid through said respective module.

22. The dynamometer of claim 20 further comprising sump means for allowing the working liquid to be discharged via gravity from said modules within the closed housing by means of said outlet valves in reducing the pressure within the modules to zero.

23. A dynamometer for measuring the output power of a prime mover comprising; a closed housing having removable side panels and inlet and outlet means for respectively providing a working liquid within said housing for use during operation of the dynamometer and for emptying said housing of said liquid; a shaft positioned within and extending from said housing in a sealed manner and coupled to and rotationally displaced by the prime mover; a plurality of modules each including, in combination, a stator and a rotor and disposed within said housing and along the length of said shaft; first and second coupling means for respectively coupling each of said stators to said housing in a fixed manner and each of said rotors to said shaft along the length thereof so that said rotors rotate therewith, wherein each of said first and second coupling means permits easy installation in and removal from said housing of a stator and rotor combination; and means coupled to said housing and responsive to rotation of said shaft for measuring the output power of a prime mover.

* * * * *